United States Patent
Lu

(10) Patent No.: US 9,563,312 B2
(45) Date of Patent: Feb. 7, 2017

(54) DISPLAY PANEL HAVING TOUCH FUNCTION, DISPLAY DEVICE, AND CONTROL METHOD FOR THE SAME

(71) Applicant: Shenzhen China Star Optoelectronics Technology Co., Ltd., Shenzhen, Guangdong (CN)

(72) Inventor: Yucheng Lu, Guangdong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 216 days.

(21) Appl. No.: 14/426,379

(22) PCT Filed: Dec. 30, 2014

(86) PCT No.: PCT/CN2014/095562
§ 371 (c)(1),
(2) Date: Mar. 5, 2015

(87) PCT Pub. No.: WO2016/101308
PCT Pub. Date: Jun. 30, 2016

(65) Prior Publication Data
US 2016/0342276 A1 Nov. 24, 2016

(30) Foreign Application Priority Data

Dec. 24, 2014 (CN) .......................... 2014 1 0817400

(51) Int. Cl.
*G06F 3/041* (2006.01)
*G02F 1/1362* (2006.01)
(Continued)

(52) U.S. Cl.
CPC ........... *G06F 3/0418* (2013.01); *G02F 1/1362* (2013.01); *G02F 1/13338* (2013.01); *G02F 1/13624* (2013.01); *G02F 1/136213* (2013.01); *G02F 1/136286* (2013.01); *G06F 3/044* (2013.01); *G06F 3/0412* (2013.01); *G09G 3/3659* (2013.01); *G06F 2203/04111* (2013.01); *G09G 2300/0842* (2013.01)

(58) Field of Classification Search
CPC ....... G06F 3/0412; G06F 3/0416; G06F 3/044
USPC .................................................. 345/173, 174
See application file for complete search history.

(56) References Cited

U.S. PATENT DOCUMENTS

| | | | | |
|---|---|---|---|---|
| 2010/0193257 A1* | 8/2010 | Hotelling | ............... | G06F 3/0412 178/18.06 |
| 2012/0056835 A1* | 3/2012 | Choo | .................... | G06F 3/0412 345/173 |
| 2014/0062907 A1* | 3/2014 | Kim | ........................ | G06F 3/038 345/173 |

* cited by examiner

*Primary Examiner* — Koosha Sharifi-Tafreshi
(74) *Attorney, Agent, or Firm* — Andrew C. Cheng

(57) ABSTRACT

A display panel having a touch function, a display device, and a control method. The panel includes a first substrate having multiple pixel units. Each pixel unit includes a liquid crystal capacitor, a first switch, a second switch, and a first storage capacitor. A control, an input, and an output terminal of the first switch are respectively connected with a first controller, the liquid crystal capacitor, and the first storage capacitor. A control, an input, and an output terminal of the second switch are respectively connected with a signal controller, a common electrode, and the liquid crystal capacitor and the first storage capacitor. When a picture change rate is lower than a preset rate value, a turn-off time of the second switch is increased, and the first switch is turned on to increase the quantity of electric charge for maintaining a voltage of the liquid crystal capacitor.

12 Claims, 3 Drawing Sheets

(51) Int. Cl.
*G06F 3/044* (2006.01)
*G02F 1/1333* (2006.01)
*G09G 3/36* (2006.01)

DISPLAY PANEL HAVING TOUCH FUNCTION, DISPLAY DEVICE, AND CONTROL METHOD FOR THE SAME

BACKGROUND OF THE INVENTION

1. Field of the Invention

The present invention relates to a touch display, and more particularly to a display panel having a touch function, a display device and a control method for the same.

2. Description of Related Art

A touch screen is also known as a touch panel. The touch screen is a liquid crystal display device which can receive an input signal of a touch event such as a finger contact. When a user touch a graphic button on the screen, a touch feedback system can determine a touch position according to a preset driving and scanning method such that the touched graphic button is determined and an instruction type is also determined. Comparing to the conventional mechanical button panel, the touch screen is more convenient, so that the touch screen has been widely used.

A projected capacitive touch screen is one of common touch screens. The projected capacitive touch screen utilizes a touch technology of a capacitance change generated by a finger to approach the capacitive touch screen. The touch technology can be divided into a self-capacitance type and a mutual-capacitance type. The touch technology can also be divided into an out-cell type and an embedded type. The embedded type can also be divided into an in-cell type and an on-cell type. Using the in-cell and self-capacitance touch technology as an example, multiple touch electrodes are formed on a surface of a glass substrate and are made of a conductive material. The touch electrodes are respectively connected with a controller through lead wires. The touch electrodes respectively formed capacitors with a ground, which is called the self-capacitance. When a finger touch a touch screen, the capacitance of the finger will add on a screen capacitor such that the quantity of electric charge of the screen capacitor is increased. According to a capacitance change before and after touching by the finger, a touch position is determined.

With the development of the touch screen technology, the in-cell technology is gradually become the mainstream technology for medium and small size touch screen. Through integrating the touch electrodes into a cell of a panel, and through the same controller IC to process a display signal and a touch screen signal respectively by a time-division multiplex control method such that the thickness and the weight of the touch display panel are reduced.

As shown in FIG. 1, FIG. 1 is an equivalent circuit diagram of a touch display panel according to the conventional art.

The display panel includes a data line 101 and a scanning line 102, a signal control line 103, a first thin-film transistor (TFT) $T_1$, a second thin-film transistor (TFT) $T_2$, a liquid crystal capacitor $C_{LC}$ and a storage capacitor $C_{st1}$. A gate of the first TFT $T_1$ is connected with the scanning line 102. A source of the first TFT $T_1$ is connected with the data line 101. A drain of the first TFT $T_1$ is connected with terminals of the liquid crystal capacitor $C_{LC}$ and the storage capacitor $C_{st1}$ which are connected in parallel. Another terminal of each of the liquid crystal capacitor $C_{LC}$ and the storage capacitor $C_{st1}$ is connected with a drain of the second TFT $T_2$. A source of the second TFT $T_2$ is connected with the signal control line 103. A gate of the second TFT $T_2$ is connected with a common electrode 104. When the signal control line 103 controls the $T_2$ to be turned on, the touch display panel is in a display mode. Through the data line 101 and the scanning line 102 the liquid crystal capacitor $C_{LC}$ and the storage capacitor $C_{st1}$ are charged and discharged in order to control the deflection of the liquid crystal molecules so as to realize a different display screen. When the signal control line 103 control the second TFT $T_2$ to be turned off, the touch display panel is in a touch mode for detecting a touch signal.

As mentioned above, the operation principle of the in-cell technology is a time-division multiplex control method for the touch mode and the display mode. That is, each frame time is divided into two time intervals which respectively transmit and process the display signal and touch signal. However, to reach an ideal touch effect, a higher report rate is required. In the conventional art, the time-division multiplex control method will limit the time period for processing the touch signal such that the report rate of the touch signal is limited.

In the conventional art, in order to overcome the above difficulties, generally, the frame rate is decreased to increase the time period for the touch signal. However, decreasing the frame rate means increasing the time interval. In the touch mode, although the switch $T_2$ is turned off, a leakage current will still be generated in the circuit so as to decrease the voltage at two terminals of the liquid crystal capacitor and a normal voltage cannot be reached, which will seriously affect the display effect of the touch display panel.

SUMMARY OF THE INVENTION

The technology solved by the present invention is to provide a display panel having a touch function, a display device, and control method for the same in order to increase a report rate of touch signals under a premise of displaying a normal picture.

In order to solve the above problem, a technology solution adopted by the present invention is: a display panel having a touch function, comprising: a first substrate; a second substrate disposed oppositely to the first substrate; and a liquid crystal layer disposed between the first substrate and the second substrate; wherein, first substrate includes multiple scanning lines, multiple data lines, and multiple pixel units defined by the scanning lines and the data lines crossing and insulating with each other; each pixel unit includes a liquid crystal capacitor, a first switch, a second switch, and a first storage capacitor; wherein, a control terminal of the first switch is connected with a first controller through a first control line; an input terminal of the first switch is connected with the liquid crystal capacitor; an output terminal of the first switch is connected with the first storage capacitor; wherein, a control terminal of the second switch is connected with a signal controller through a signal control line; an input terminal of the second switch is connected with a common electrode; an output terminal of the second switch is respectively connected with the liquid crystal capacitor and the first storage capacitor; and when a picture change rate is lower than a preset rate value, the signal controller control a turn-off time of the second switch to be increased, and the first controller control the first switch to be turned on in order to increase the quantity of electric charge for maintaining a voltage of the liquid crystal capacitor.

Wherein, each pixel unit includes a third switch and a second storage capacitor; a control terminal of the third switch is connected with the scanning line; an input terminal of the third switch is connected with the data line; an output terminal of the third switch is respectively connected with the liquid crystal capacitor, the second storage capacitor, and the input terminal of the first switch; the second storage capacitor is connected with the output terminal of the second switch.

Wherein, the first switch is disposed between the first storage capacitor and the second substrate.

Wherein, when the picture change rate is greater than the preset value, the signal controller controls a turn-off time of the second switch to be decreased in order to decrease the quantity of electric charge of the first storage capacitor.

Wherein, all of the first switch, the second switch, and the third switch are thin-film transistors, and are respectively a first thin-film transistor, a second thin-film transistor, and a third thin-film transistor; a control terminal, an input terminal, an output terminal of the first switch are respectively corresponding to a gate, a source, and a drain of the first thin-film transistor; a control terminal, an input terminal, an output terminal of the second switch are respectively corresponding to a gate, a source, and a drain of the second thin-film transistor; a control terminal, an input terminal, an output terminal of the third switch are respectively corresponding to a gate, a source, and a drain of the third thin-film transistor.

In order to solve the above technology problem, another technology solution adopted by the present invention is: a display device having a touch function, comprising: a display panel having: a first substrate; a second substrate disposed oppositely to the first substrate; and a liquid crystal layer disposed between the first substrate and the second substrate; wherein, first substrate includes multiple scanning lines, multiple data lines, and multiple pixel units defined by the scanning lines and the data lines crossing and insulating with each other; each pixel unit includes a liquid crystal capacitor, a first switch, a second switch, and a first storage capacitor; wherein, a control terminal of the first switch is connected with a first controller through a first control line; an input terminal of the first switch is connected with the liquid crystal capacitor; an output terminal of the first switch is connected with the first storage capacitor; wherein, a control terminal of the second switch is connected with a signal controller through a signal control line; an input terminal of the second switch is connected with a common electrode; an output terminal of the second switch is respectively connected with the liquid crystal capacitor and the first storage capacitor; and when a picture change rate is lower than a preset rate value, the signal controller control a turn-off time of the second switch to be increased, and the first controller control the first switch to be turned on in order to increase the quantity of electric charge for maintaining a voltage of the liquid crystal capacitor.

In order to solve the above technology problem, another technology solution adopted by the present invention is: a control method, comprising: obtaining a picture change rate which is displayed currently through a display device having a touch function; determining that if the picture change rate is lower than a preset rate value; and when the picture change rate is lower than the preset rate value, controlling a switch to be turned on in order to charge a first storage capacitor such that the quantity of electric charge of the first storage capacitor is increased so as to maintain a voltage of a liquid crystal capacitor, wherein, the first storage capacitor, the liquid crystal capacitor, and a second storage capacitor are connected in parallel.

Wherein, before the step of when the picture change rate is lower than the preset rate value, controlling a switch to be turned on in order to charge a first storage capacitor such that the quantity of electric charge of the first storage capacitor is increased so as to maintain a voltage of a liquid crystal capacitor, further comprising a step of: decreasing a frame rate of a display signal in order to increase a control time of a touch signal.

The beneficial effects of the present invention are: comparing to the conventional art, the present invention adds a first switch and a first storage capacitor based on the conventional touch display panel. The first switch and the first storage capacitor can instantly provide a voltage for compensating a leakage current of the liquid crystal capacitor such that when the frame rate of the display panel is lower, the display panel can still display a normal picture. Besides, when the display signal is lower, correspondingly, the process time of the touch signal of the display panel is also increased in order to increase the report rate of the touch signal and reduce the loss of the touch panel. In addition, through compensating the voltage at the common electrode such that the voltage difference of the liquid crystal capacitor before and after the polarity change of the power source is constant in order to maintain a normal display of the picture. Besides, when the frequency of the display signal is decreased, correspondingly, the process time of the touch signal for the display panel is increased in order to increase the report rate of the touch signal and decrease the loss of the touch panel.

DETAILED DESCRIPTION OF THE PREFERRED EMBODIMENT

The following will combine drawings and embodiments for detailed description of the present invention.

Figure 1:
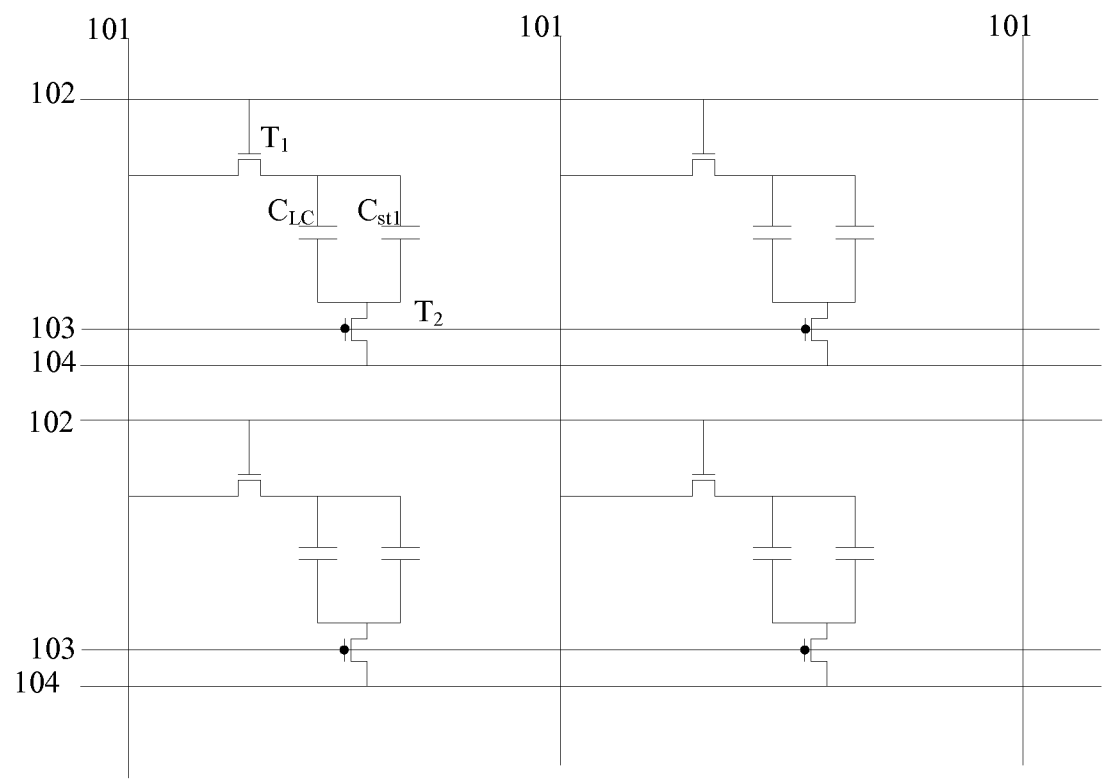
FIG. 1 is an equivalent circuit diagram of a display device according to the conventional art.
Figure 2:
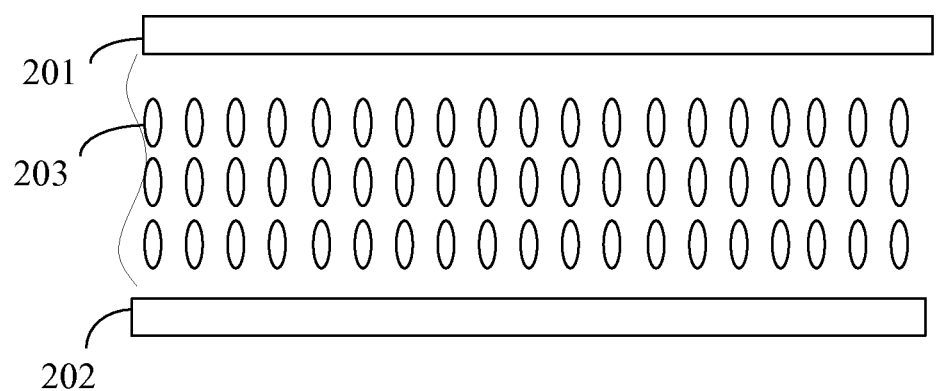
FIG. 2 is a schematic diagram of a display panel having a touch function according to an embodiment of the present invention.

With reference to FIG. 2, FIG. 2 is a schematic diagram of a display panel having a touch function according to an embodiment of the present invention. The display panel of the present embodiment includes a first substrate 201, a second substrate 202 disposed oppositely to the first substrate 201, and a liquid crystal layer 203 disposed between the first substrate 201 and the second substrate 202.

In order to realize a touch function and a display function, the display panel having a touch function generally requires touch electrodes and pixel electrodes. In the conventional art, the touch electrodes generally includes touch electrodes RX (not shown) disposed horizontally and touch electrodes TX disposed vertically. Wherein, the touch electrodes RX are located outside the second substrate 202. In order to reduce the thickness and weight of the display panel, in the present embodiment, the touch electrodes TX disposed vertically are integrated with a common electrode Array Vcom of the first substrate 201, located inside the first substrate 201, and arranged on the display panel as a matrix.

In order realize the display function and the touch function simultaneously, the display panel utilize a time-division multiplex control method to respectively control the touch signal and the display signal. That is, for each frame time, the frame time is divided into two time intervals which respectively transmit and process the display signal and the touch signal. When the display panel is under the touch mode, the display panel does not charge the pixel electrodes theoretically. In order to maintain the voltage difference between two terminals of the pixel electrode so as to maintain the voltage of the liquid crystal capacitor, the present embodiment also includes a first storage capacitor disposed in parallel with the liquid crystal capacitor.

Figure 3:
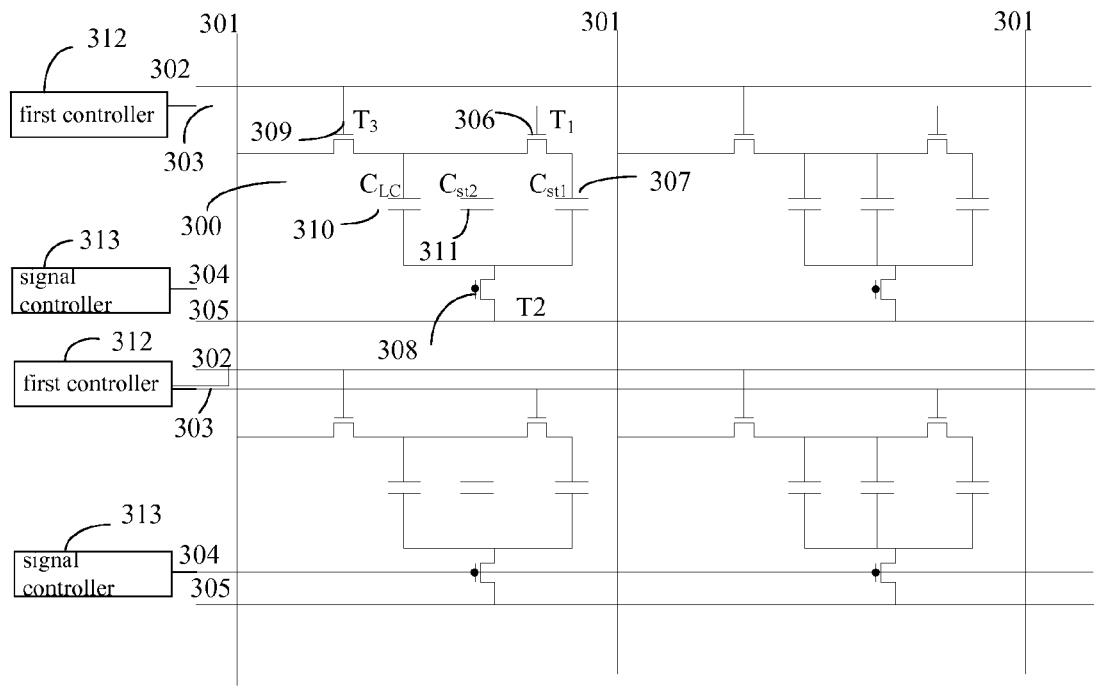
FIG. 3 is an equivalent circuit diagram of a first substrate of the display panel shown in FIG. 2.

As shown in FIG. 3, FIG. 3 is an equivalent circuit diagram of a first substrate of the display panel shown in FIG. 2.

The first substrate 201 of the present embodiment includes multiple scanning lines 302, multiple data lines 301, multiple pixel units 300 defined by the scanning lines 302 and the data lines 301 crossing and insulating with each other. Each of the pixel unit includes a liquid crystal capacitor $C_{LC}$310, a first storage capacitor $C_{st1}$307, a second storage capacitor $C_{st2}$311, a first switch T1 306, a second switch T2 308, and a third switch T3 309.

All of the first switch T1 306, the second switch T2 308, and the third switch T3 309 are thin-film transistors, and are respectively a first thin-film transistor, a second thin-film transistor, and a third thin-film transistor. A control terminal, an input terminal, and an output terminal of the first switch T1 306 are respectively corresponding to a gate, a source, and a drain of the first thin-film transistor. A control terminal, an input terminal, and an output terminal of the second switch T2 308 are respectively corresponding to a gate, a source, and a drain of the second thin-film transistor. A control terminal, an input terminal, and an output terminal of the third switch T3 309 are respectively corresponding to a gate, a source, and a drain of the third thin-film transistor.

In another embodiment, the first switch T1 306, the second switch T2 308, and the third switch T3 309 can be other types of switches. For example, the first switch T1 306, the second switch T2 308, and the third switch T3 309 are respectively a first darlington transistor or bipolar transistor, a second darlington transistor or bipolar transistor, and a third darlington transistor or bipolar transistor. As a result, a control terminal, an input terminal, an output terminal of the first switch T1 306 are respectively corresponding to a base, a collector, and a emitter of the first darlington transistor or bipolar transistor. A control terminal, an input terminal, and an output terminal of the second switch T2 308 are respectively corresponding to a base, a collector, and a emitter of the second darlington transistor or bipolar transistor. A control terminal, an input terminal, and an output terminal of the third switch T3 309 are respectively corresponding to a base, a collector, and a emitter of the third darlington transistor or bipolar transistor.

With reference to FIG. 3, the control terminal of the first switch T1 306 is connected with a first controller 312 through a first control line 303. The input terminal of the first switch T1 306 is connected with the liquid crystal capacitor $C_{LC}$310. The output terminal of the first switch T1 306 is connected with the first storage capacitor $C_{st1}$307. The control terminal of the second switch T2 308 is connected with a signal controller 313 through a signal control line 304. The input terminal of the second switch T2 308 is connected with a common electrode 305 (that is, Array Vcom). The output terminal of the second switch T2 308 is respectively connected with the liquid crystal capacitor $C_{LC}$310 and the first storage capacitor $C_{st1}$307.

The control terminal of the third switch T3 309 is connected with the scanning line 302 for inputting a scanning signal to the pixel unit 300. The input terminal of the third switch T3 309 is connected with the data line 301 for inputting a data signal to the liquid crystal capacitor $C_{LC}$310 and the second storage capacitor $C_{st2}$311, that is, providing an input voltage to the liquid crystal capacitor $C_{LC}$310 and the second the second storage capacitor $C_{st2}$311. The output terminal of the third switch T3 309 is respectively connected with the liquid crystal capacitor $C_{LC}$310, the second the second storage capacitor $C_{st2}$311, and the input terminal of the first switch T1 306. The second storage capacitor $C_{st2}$311 is also connected with the output terminal of the second switch T2 308.

The second switch T2 308 complete one turning on and off within each frame time in order to switch the display function and the touch function. When the second switch T2 308 is turned on, the display panel is in the display mode, and the display panel processes the display signal. As shown in FIG. 3, at the display mode, an input signal charge the liquid crystal capacitor $C_{LC}$310 and the second the second storage capacitor $C_{st2}$311 in order to store a require voltage for a display in the touch mode. When the second switch T2 308 is turned off, the display panel is switched to the touch mode, and the display panel processes the touch signal.

Because the display panel require certain of process time for controlling the touch signal, in order to increase the report rate of the touch signal and the precision of the touch detection, extending the control time for the touch signal is required. In the present embodiment, a frame rate of the display signal is decreased in order to reduce a time ratio occupied by the display signal in each frame time. Relatively, a time ratio occupied by the touch signal is increased.

When increasing the control time of the touch signal, at the same time, a time period of stop charging the liquid crystal capacitor $C_{LC}$310 is also increased. Therefore, before the signal controller 313 decrease the frame rate of the display signal, the signal controller determine that if a picture change rate is lower than a preset rate value. For example, if the picture does not change in 0.5 sec, determining that the picture change rate is lower than the preset rate value. Specifically, the signal controller 313 obtain a time difference between one picture displayed currently and a previously picture to determine the picture change rate.

At this time, a turn-off time of the second switch T2 308 is increased by the signal controller 313 in order to increase the control time of the touch signal. Besides, the first controller 312 controls the first switch T1 306 to be turned on through the first control line 303. When the second switch T2 308 is also turned on, the first storage capacitor $C_{st1}$307 is charged such that the quantity of electrical charge of the first storage capacitor $C_{st1}$307 is also increased. When the second switch T2 308 is turned off again, the first storage capacitor $C_{st1}$307 and the second storage capacitor $C_{st2}$311 are both discharged to the liquid crystal capacitor $C_{LC}$310 so that the liquid crystal capacitor $C_{LC}$310 is charged in order to maintain a normal voltage of the liquid crystal capacitor $C_{LC}$310 for a normal display. As a result, the voltage difference of the liquid crystal capacitor $C_{LC}$310 of each pixel unit 300 is constant in order to ensure the uniformity of the display panel screen.

When the signal controller 313 determines that the picture change rate is greater than the preset rate value, the turn-off time of the second switch is decreased by the signal controller 313 in order to decrease the quantity of electrical charge of the first storage capacitor.

In a normal condition, a required quantity of electric charge of the first capacitor $C_{st2}$311 is inversely proportional to the frame rate of the display signal. When the frame rate of the display signal is smaller, the control time of the touch signal of the display panel is longer, and the quantity of electric charge for maintaining the liquid crystal capacitor $C_{LC}$310 for a normal display is larger. Correspondingly, a required quantity of electric charge of the first storage capacitor $C_{st1}$307 is larger. Generally, when the frame rate of the display signal is lower to 10 Hz to 20 Hz, the capacitance of the first storage capacitor $C_{st1}$307 is about 2 pf to 0.8 pf.

Besides, in the charge and discharge process of the liquid crystal capacitor $C_{LC}$310 with the first storage capacitor $C_{st1}$307 and the second storage capacitor $C_{st2}$311, a coupling effect is generated such that a DC offset value is generated. In addition, when the voltage change between the two terminals of the liquid crystal capacitor $C_{LC}$310, the first storage capacitor $C_{st1}$307 and the second storage capacitor $C_{st2}$311 is faster, the coupling effect is more serious, that is, the DC offset value is larger. The operation voltage of the display panel is an alternating current (AC), that is, an AC driving. When the polarity of the current is changed, because of the DC offset value, the voltage at two terminals of the liquid crystal capacitor $C_{LC}$310 is insufficient to support a normal display of a picture. Besides, the DC offset value at each pixel unit 400 is different, that is, the voltage difference at two terminals of each liquid crystal capacitor $C_{LC}$310 is different. Finally, the entire screen is displayed unevenly.

In order to overcome the DC offset value caused by the coupling effect, in the present embodiment, the display panel compensates the voltage at the common electrode 305 (Array Vcom) such that the voltage difference of the liquid crystal capacitor $C_{LC}$310 before and after the polarity change of the power source is constant in order to maintain a normal display of the picture. Specifically, in an ideal situation the voltage at two terminals of the liquid crystal capacitor is Vpixel=Vdata-Vcom, wherein, Vdata is an input voltage at the input terminal of the liquid crystal capacitor $C_{LC}$310; Vcom is the voltage at common electrode 305 (Array Vcom). When the DC offset value ΔV is existed, the input voltage become Vdata', and Vdata'=Vdata-ΔV. In order to maintain the voltage difference at two terminals of the liquid crystal capacitor $C_{LC}$310 to be constant, the voltage Vcom at the common electrode Array Vcom should be compensated. According to the formula Vpixel=(Vdata-ΔV)-(Vcom-ΔV'), if the power signal is under a high frequency, the DC offset value ΔV is larger. A compensated voltage ΔV' for the voltage Vcom at the common electrode Array Vcom is larger. If the power signal is under a low frequency, the DC offset value ΔV is smaller. A compensated voltage ΔV' for the voltage Vcom at the common electrode Array Vcom is smaller. At this time, the voltage Vcom at the common electrode Array Vcom is larger such that the voltage difference of the liquid crystal capacitor $C_{LC}$310 is constant.

In other embodiments, the first switch T1 306 is not disposed at a first substrate. The first switch T1 306 can be disposed between the first storage capacitor and the second substrate. The first switch can also be disposed at other layers of the display panel. The only requirement is: the first switch can turn on and off the first storage capacitor such that the first storage capacitor can be charged and discharged.

Comparing to the conventional art, the present invention adds a first switch (T1) and a first storage capacitor ($C_{st1}$) based on the conventional touch display panel. The first switch (T1) and the first storage capacitor ($C_{st1}$) can instantly provide a voltage for compensating a leakage current of the liquid crystal capacitor such that when the frame rate of the display panel is lower, the display panel can still display a normal picture. Besides, when the display signal is lower, correspondingly, the process time of the touch signal of the display panel is also increased in order to increase the report rate of the touch signal and reduce the loss of the touch panel. In addition, through compensating the voltage at the common electrode such that the voltage difference of the liquid crystal capacitor before and after the polarity change of the power source is constant in order to maintain a normal display of the picture.

The present invention also provides a display device having a touch function. The display device includes the display panel described in anyone of the above embodiments. The specific description can refer to FIG. 2 and FIG. 3 and related illustration.

Figure 4:
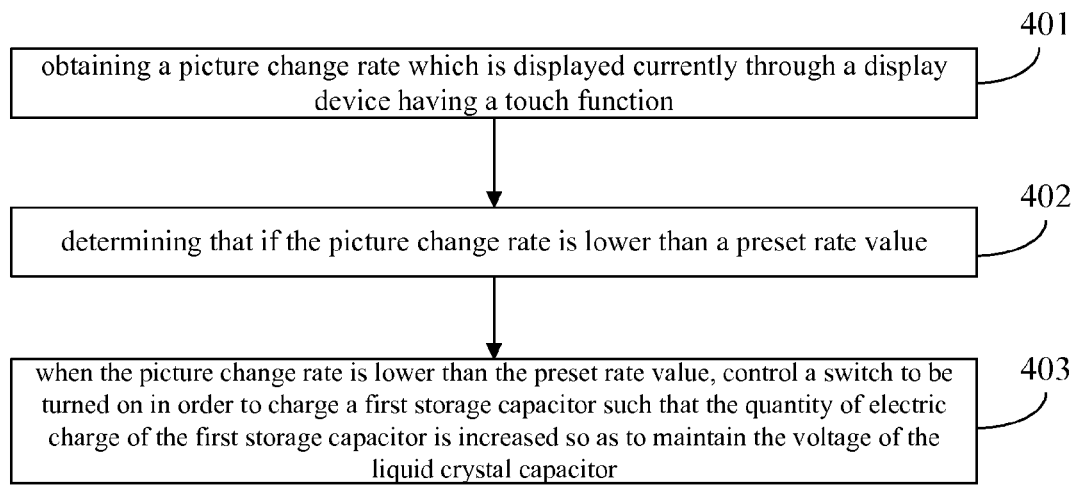
FIG. 4 is a flow chart of a control method according to an embodiment of the present invention.

With reference to FIG. 4, FIG. 4 is a flow chart of a control method according to an embodiment of the present invention.

The control method of the present embodiment comprises:

401: obtaining a picture change rate which is displayed currently through a display device having a touch function.

In order realize the display function and the touch function simultaneously, the display panel utilizes a time-division multiplex control method to respectively control the touch signal and the display signal. That is, for each frame time, the frame time is divided into two time intervals which respectively transmit and process the display signal and the touch signal. When the display panel is under the touch mode, the display panel does not charge the pixel electrodes theoretically. In order to maintain the voltage difference between two terminals of the pixel electrode so as to maintain the voltage of the liquid crystal capacitor, in the conventional art, a second storage capacitor is disposed to charge the liquid crystal capacitor. In the present embodiment also includes a first storage capacitor disposed in parallel with the liquid crystal capacitor.

Because the display panel require certain of process time for controlling the touch signal, in order to increase the report rate of the touch signal and the precision of the touch detection, extending the control time for the touch signal is required. When increasing the control time of the touch signal, at the same time, a time period of stop charging the liquid crystal capacitor is also increased. To not affect a normal display of a current picture, that is, to ensure that in the time period of stop charging the liquid crystal capacitor, the quantity of electric charge for the liquid crystals to maintain a display is sufficient. The display device requires obtaining a picture change rate displayed currently.

402: determining that if the picture change rate is lower than a preset rate value. Specifically, the display device obtains a time difference between a picture displayed currently and a picture displayed previously in order to determine the picture change rate displayed currently. For example, if the picture displayed currently does not change in 0.5 sec, determining that the picture change rate is lower than the preset rate value.

403: When the picture change rate is lower than the preset rate value, control a switch to be turned on in order to charge a first storage capacitor such that the quantity of electric charge of the first storage capacitor is increased so as to maintain the voltage of the liquid crystal capacitor. Wherein, the first storage capacitor, the liquid crystal capacitor, and the second storage capacitor are connected in parallel.

Wherein, the control terminal of the switch is connected with a first controller through a first control line. The input terminal of the first switch is connected with the liquid crystal capacitor. The output terminal of the switch is connected with the first storage capacitor.

When the picture change rate is lower than the preset rate value, and the display device is under a mode for processing the display signal, the first controller controls the switch to be turned on through the first control line in order to charge the first storage capacitor and increase the quantity of the electrical charge of the first storage capacitor.

When the second switch is turned off again, the first storage capacitor and the second storage capacitor are both discharged to charge the liquid crystal capacitor so that the liquid crystal capacitor is charged in order to maintain a normal voltage of the liquid crystal capacitor for a normal display. As a result, the voltage difference of the liquid crystal capacitor of each pixel unit is constant in order to ensure the display uniformity of the display panel.

When the picture change rate is greater than the preset rate value, the display device controls the switch to be turned off in order to stop charging the first storage capacitor.

In a normal condition, a required quantity of electric charge of the first capacitor is inversely proportional to the frame rate of the display signal. When the frame rate of the display signal is smaller, the process time of the touch signal of the display panel is longer, and the quantity of electric charge for maintaining the liquid crystal capacitor for a normal display is larger. Correspondingly, the required quantity of electric charge of the first storage capacitor is larger. Generally, when the frame rate of the display signal is 10 Hz to 20 Hz, the required capacitance of the first storage capacitor is about 2 pf to 0.8 pf.

Besides, in the charge and discharge process of the liquid crystal capacitor with the first storage capacitor and the second storage capacitor, a coupling effect is generated such that a DC offset value is generated. In addition, when the voltage change between the two terminals of the liquid crystal capacitor, the first storage capacitor and the second storage capacitor is faster, the coupling effect is more serious, that is, the DC offset value is larger. The operation voltage of the display panel is an alternating current (AC), that is, an AC driving. When the polarity of the current is changed, because of the DC offset value, the voltage at two terminals of the liquid crystal capacitor is insufficient to support a normal display of a picture. Besides, the DC offset value at each pixel unit is different, that is, the voltage difference at two terminals of each liquid crystal capacitor is different. Finally, the entire screen is displayed unevenly.

In order to overcome the DC offset value caused by the coupling effect, in the present embodiment, the display panel compensates the voltage at the common electrode Array Vcom such that the voltage difference of the liquid crystal capacitor before and after the polarity change of the power source is constant in order to maintain a normal display of the picture. Specifically, in an ideal situation, the voltage at two terminals of the liquid crystal capacitor is Vpixel=Vdata−Vcom, wherein, Vdata is an input voltage at the input terminal of the liquid crystal capacitor; Vcom is the voltage at common electrode Array Vcom. When the DC offset value ΔV is existed, the input voltage become Vdata', and Vdata'=Vdata−ΔV. In order to maintain the voltage difference at two terminals of the liquid crystal capacitor $C_{LC}$310 to be constant, the voltage Vcom at the common electrode Array Vcom should be compensated. According to the formula Vpixel=(Vdata−ΔV)−(Vcom−ΔV'), if the power signal is under a high frequency, the DC offset value ΔV is larger. A compensated voltage ΔV' for the voltage Vcom at the common electrode Array Vcom is larger. If the power signal is under a low frequency, the DC offset value ΔV is smaller. A compensated voltage ΔV' for the voltage Vcom at the common electrode Array Vcom is smaller. At this time, the voltage Vcom at the common electrode Array Vcom is larger such that the voltage difference of the liquid crystal capacitor is constant.

Comparing to the conventional art, the control method of the present embodiment, when the picture change rate is lower than the preset rate value, control the switch to be turned on to charge the first storage capacitor in order to increase the quantity of electric charge of the first storage capacitor so as to instantly provide a voltage for compensating a leakage current of the liquid crystal capacitor such that when the frame rate of the display panel is lower, the display panel can also display a normal picture. Besides, when the display signal is lower, correspondingly, the process time of the touch signal of the display panel is also increased in order to increase the report rate of the touch signal and reduce the loss of the touch panel. In addition, through compensating the voltage at the common electrode such that the voltage difference of the liquid crystal capacitor before and after the polarity change of the power source is constant in order to maintain a normal display of the picture.

Figure 5:
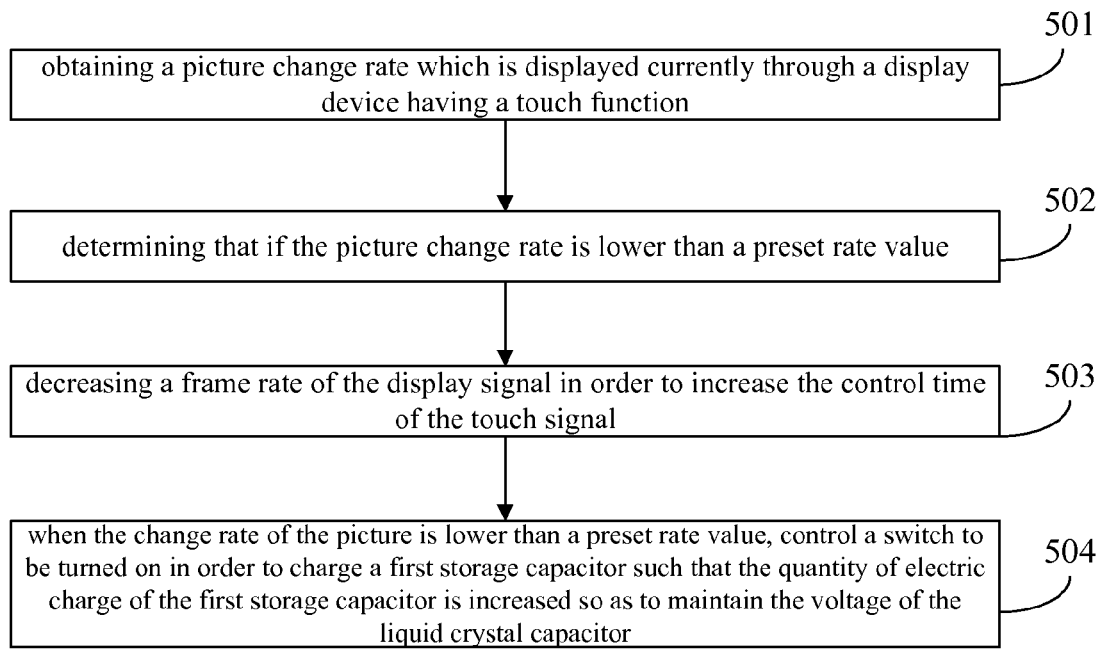
FIG. 5 is a flow chart of a control method according to another embodiment of the present invention.

With reference to FIG. 5, FIG. 5 is a flow chart of a control method according to another embodiment of the present invention. The difference between the present embodiment and the above embodiment is: after a step 502: determining that if the picture change rate is lower than a preset rate value and before a step 504: when the change rate of the picture is lower than a preset rate value, control a switch to be turned on in order to charge a first storage capacitor such that the quantity of electric charge of the first storage capacitor is increased so as to maintain the voltage of the liquid crystal capacitor, further comprises a step 503: decreasing a frame rate of the display signal in order to increase the control time of the touch signal.

When the picture change rate is lower than a preset rate value, for example, if the picture does not change in 0.5 sec, at this time, the number of the display signals in a frame time is not large, and the display device does not require too much time for processing the display signal. In order to increase the utilization rate of a frame time, the frame rate of the display signal is decreased so as to reduce a time ratio occupied by the display signal in a frame time. Relatively, a time ratio occupied by the touch signal is increased. As a result, the control time of the touch signal is increased in order to increase the report rate of the touch signal and the precision of the touch detection.

Comparing to the conventional art, t the control method of the present embodiment, when the picture change rate is lower than the preset rate value, control the switch to be turned on to charge the first storage capacitor in order to increase the quantity of electric charge of the first storage capacitor so as to instantly provide a voltage for compensating a leakage current of the liquid crystal capacitor such that when the frame rate of the display panel is lower, the display panel can also display a normal picture. Besides, when the display signal is lower, correspondingly, the process time of the touch signal of the display panel is also increased in order to increase the report rate of the touch signal and reduce the loss of the touch panel. In addition, through compensating the voltage at the common electrode such that the voltage difference of the liquid crystal capacitor before and after the polarity change of the power source is constant in order to maintain a normal display of the picture.

Comparing to the above embodiment, the control method of the present embodiment decreases the frame rate of the display signal when the picture change rate is lower than the preset rate value in order to decrease the time ratio occupied by the display signal in one frame time and increase the time ratio occupied by the touch signal. The report rate of the touch signal and the touch precision of the display device are increased.

The above embodiments of the present invention are not used to limit the claims of this invention. Any use of the content in the specification or in the drawings of the present invention which produces equivalent structures or equivalent processes, or directly or indirectly used in other related technical fields is still covered by the claims in the present invention.

What is claimed is:

1. A display panel having a touch function, comprising:
a first substrate;
a second substrate disposed oppositely to the first substrate; and
a liquid crystal layer disposed between the first substrate and the second substrate;
wherein, first substrate includes multiple scanning lines, multiple data lines, and multiple pixel units defined by the scanning lines and the data lines crossing and insulating with each other; each pixel unit includes a liquid crystal capacitor, a first switch, a second switch, and a first storage capacitor;
wherein, a control terminal of the first switch is connected with a first controller through a first control line; an input terminal of the first switch is connected with the liquid crystal capacitor; an output terminal of the first switch is connected with the first storage capacitor;
wherein, a control terminal of the second switch is connected with a signal controller through a signal control line; an input terminal of the second switch is connected with a common electrode; an output terminal of the second switch is respectively connected with the liquid crystal capacitor and the first storage capacitor; and
when a picture change rate is lower than a preset rate value, the signal controller control a turn-off time of the second switch to be increased, and the first controller control the first switch to be turned on in order to increase the quantity of electric charge for maintaining a voltage of the liquid crystal capacitor.

2. The display panel according to claim 1, wherein, each pixel unit includes a third switch and a second storage capacitor; a control terminal of the third switch is connected with the scanning line; an input terminal of the third switch is connected with the data line; an output terminal of the third switch is respectively connected with the liquid crystal capacitor, the second storage capacitor, and the input terminal of the first switch; the second storage capacitor is connected with the output terminal of the second switch.

3. The display panel according to claim 1, wherein, the first switch is disposed between the first storage capacitor and the second substrate.

4. The display panel according to claim 1, wherein, when the picture change rate is greater than the preset value, the signal controller controls a turn-off time of the second switch to be decreased in order to decrease the quantity of electric charge of the first storage capacitor.

5. The display panel according to claim 1, wherein, all of the first switch, the second switch, and the third switch are thin-film transistors, and are respectively a first thin-film transistor, a second thin-film transistor, and a third thin-film transistor; a control terminal, an input terminal, an output terminal of the first switch are respectively corresponding to a gate, a source, and a drain of the first thin-film transistor; a control terminal, an input terminal, an output terminal of the second switch are respectively corresponding to a gate, a source, and a drain of the second thin-film transistor; a control terminal, an input terminal, an output terminal of the third switch are respectively corresponding to a gate, a source, and a drain of the third thin-film transistor.

6. A display device having a touch function, comprising:
a display panel having:
a first substrate;
a second substrate disposed oppositely to the first substrate; and
a liquid crystal layer disposed between the first substrate and the second substrate;
wherein, first substrate includes multiple scanning lines, multiple data lines, and multiple pixel units defined by the scanning lines and the data lines crossing and insulating with each other; each pixel unit includes a liquid crystal capacitor, a first switch, a second switch, and a first storage capacitor;
wherein, a control terminal of the first switch is connected with a first controller through a first control line; an input terminal of the first switch is connected with the liquid crystal capacitor; an output terminal of the first switch is connected with the first storage capacitor;
wherein, a control terminal of the second switch is connected with a signal controller through a signal control line; an input terminal of the second switch is connected with a common electrode; an output terminal of the second switch is respectively connected with the liquid crystal capacitor and the first storage capacitor; and
when a picture change rate is lower than a preset rate value, the signal controller control a turn-off time of the second switch to be increased, and the first controller control the first switch to be turned on in order to increase the quantity of electric charge for maintaining a voltage of the liquid crystal capacitor.

7. The display device according to claim 6, wherein, each pixel unit includes a third switch and a second storage capacitor; a control terminal of the third switch is connected with the scanning line; an input terminal of the third switch is connected with the data line; an output terminal of the third switch is respectively connected with the liquid crystal capacitor, the second storage capacitor, and the input terminal of the first switch; the second storage capacitor is connected with the output terminal of the second switch.

8. The display panel according to claim 6, wherein, when the picture change rate is greater than the preset value, the signal controller controls a turn-off time of the second switch to be decreased in order to decrease the quantity of electric charge of the first storage capacitor.

9. The display device according to claim 6, wherein, the first switch is disposed between the first storage capacitor and the second substrate.

10. The display device according to claim 6, wherein, all of the first switch, the second switch, and the third switch are thin-film transistors, and are respectively a first thin-film transistor, a second thin-film transistor, and a third thin-film transistor; a control terminal, an input terminal, an output terminal of the first switch are respectively corresponding to a gate, a source, and a drain of the first thin-film transistor; a control terminal, an input terminal, an output terminal of the second switch are respectively corresponding to a gate, a source, and a drain of the second thin-film transistor; a control terminal, an input terminal, an output terminal of the third switch are respectively corresponding to a gate, a source, and a drain of the third thin-film transistor.

11. A control method, comprising:
  obtaining a picture change rate which is displayed currently through a display device having a touch function;
  determining that if the picture change rate is lower than a preset rate value; and
  when the picture change rate is lower than the preset rate value, controlling a switch to be turned on in order to charge a first storage capacitor such that the quantity of electric charge of the first storage capacitor is increased so as to maintain a voltage of a liquid crystal capacitor, wherein, the first storage capacitor, the liquid crystal capacitor, and a second storage capacitor are connected in parallel.

12. The control method according to claim 11, wherein, before the step of when the picture change rate is lower than the preset rate value, controlling a switch to be turned on in order to charge a first storage capacitor such that the quantity of electric charge of the first storage capacitor is increased so as to maintain a voltage of a liquid crystal capacitor, further comprising a step of:
  decreasing a frame rate of a display signal in order to increase a control time of a touch signal.

* * * * *